(12) United States Patent
Huang et al.

(10) Patent No.: US 6,639,391 B2
(45) Date of Patent: Oct. 28, 2003

(54) VARIABLE SWITCHING FREQUENCY VOLTAGE REGULATOR TO OPTIMIZE POWER LOSS

(75) Inventors: Lilly Huang, Portland, OR (US); Pavan M. Kumar, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/082,654

(22) Filed: Feb. 25, 2002

(65) Prior Publication Data

US 2003/0160597 A1 Aug. 28, 2003

(51) Int. Cl.[7] .................................................. G05F 1/40
(52) U.S. Cl. ...................... 323/284; 323/271; 323/282; 323/351
(58) Field of Search ................................ 323/265, 271, 323/282, 351, 284, 224, 225

(56) References Cited

U.S. PATENT DOCUMENTS

| | | | | | |
|---|---|---|---|---|---|
| 5,955,871 | A | * | 9/1999 | Nguyen | 323/282 |
| 6,486,645 | B1 | * | 11/2002 | Van Auken | 323/287 |
| 6,489,756 | B2 | * | 12/2002 | Kanouda et al. | 323/284 |
| 6,495,995 | B2 | * | 12/2002 | Groom et al. | 323/283 |

* cited by examiner

Primary Examiner—Adolf D. Berhane
Assistant Examiner—Gary L. Laxton
(74) Attorney, Agent, or Firm—Blakely, Sokoloff, Taylor & Zafman LLP

(57) ABSTRACT

According to one embodiment, a computer system is disclosed. The computer system includes a central processing unit (CPU) and a voltage regulator coupled to the CPU. The voltage regulator operates at a variable switching frequencies based upon the status of a feedback signal which indicates load transient events.

20 Claims, 5 Drawing Sheets

VARIABLE SWITCHING FREQUENCY VOLTAGE REGULATOR TO OPTIMIZE POWER LOSS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to voltage regulators for computer systems.

BACKGROUND

Voltage regulators, such as DC-to-DC converters, are used to provide stable voltage sources for electronic systems. Efficient voltage regulators are particularly needed for battery management in low power devices, such as laptop notebooks and cellular phones. Switching voltage regulators (or "switching regulators") are known to be an efficient type of DC-to-DC converter.

A switching regulator generates an output voltage by converting an input DC voltage into a high frequency voltage, and filtering the high frequency voltage to generate the output DC voltage. Typically, the switching regulator includes a switch for alternately coupling and de-coupling an input DC voltage source, such as a battery, to a load, such as an integrated circuit. An output filter, typically including an inductor and a capacitor, is coupled between the input voltage source and the load to filter the output of the switch and thus provide the output DC voltage.

Voltage regulators for microprocessors are subject to ever more stringent performance requirements. One trend is to increase the switching frequency of the voltage regulator to meet fast current slew rate (e.g., di/dt) demands. However power losses grow almost linearly with the voltage regulator switching frequency. Such power losses have previously caused design difficulties, performance and cost penalties in power distribution and thermal cooling.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A voltage regulator that varies switching frequency in discrete steps is described. In the following description, numerous details are set forth. According to one embodiment, a central processing unit (CPU) draws constant current from a voltage regulator in a normal mode, which results in the voltage regulator operating in a low switching frequency mode.

While in the low switching frequency mode, the voltage regulator monitors a feedback signal from the CPU. The voltage regulator determines whether the feedback signal indicates that a CPU load transient is demanded. If the CPU load transient is demanded, the voltage regulator switches to a high switching frequency mode. After the load transient ends, the voltage regulator reverts back to the low switching frequency mode.

The proposed invention differs from the conventional "variable switching frequency voltage regulators" such that the operating frequency of the voltage regulator does not change every cycle but does so only during sudden changes in the CPU transient load demand. Consequently, a gradual change in the CPU load demand does not change the switching frequency of the voltage regulator.

It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
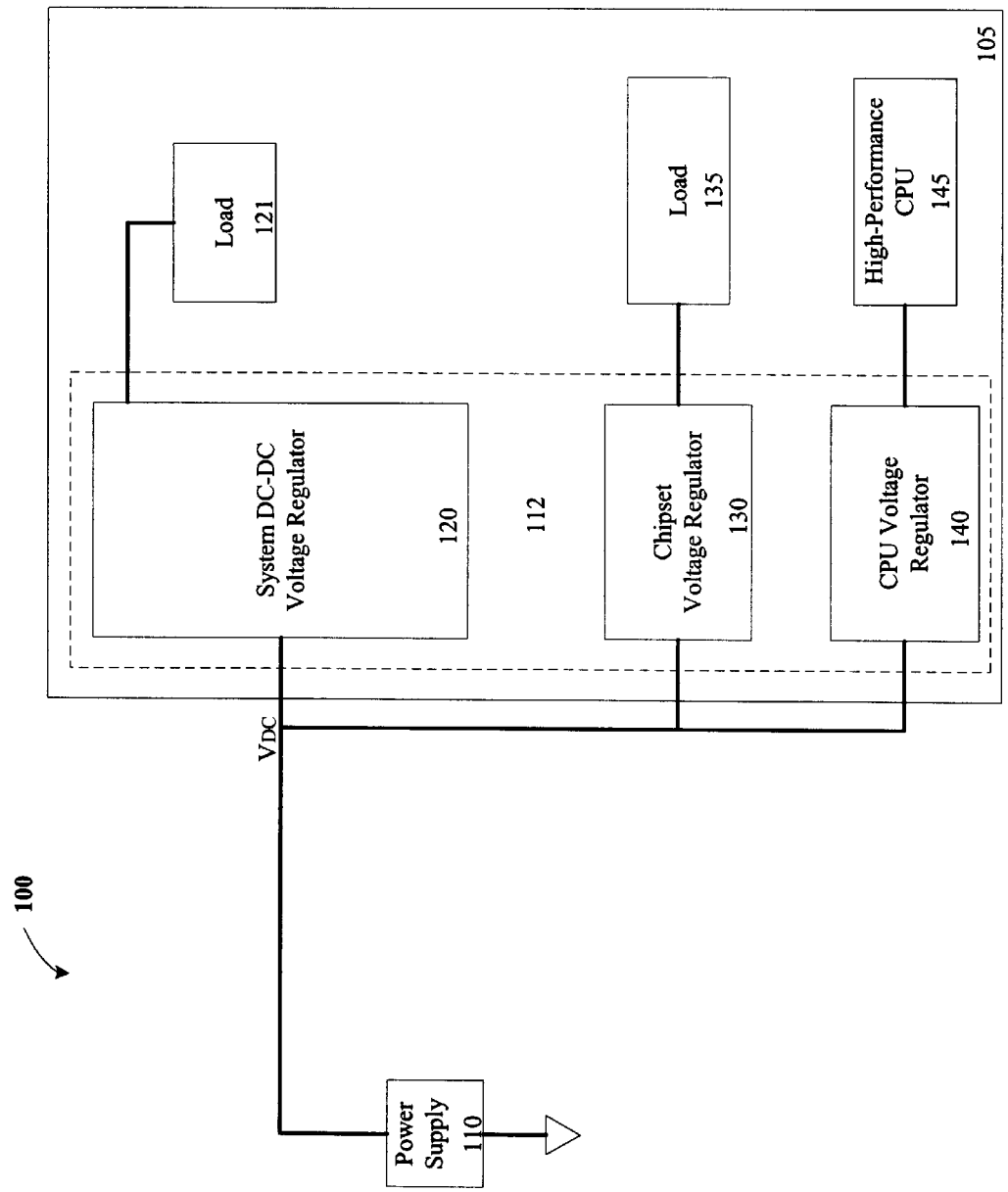
FIG. 1 illustrates one embodiment of a power delivery system.

FIG. 1 illustrates one embodiment of a power delivery system 100. Power delivery system 100 includes computer system 105 and power supply 110. Power supply 110 is coupled to computer system 105. Power supply 110 provides electrical power to computer system 150 in the form of a DC voltage ($V_{DC}$).

According to one embodiment, power supply 110 provides a 12 $V_{DC}$ voltage when fully charged, and an 8 $V_{DC}$ voltage once computer system 105 has discharged power supply 110. In a further embodiment, power supply 110 is a battery. However, in other embodiments, power supply 110 is an AC adapter that converts a received AC voltage into a DC voltage.

Computer system 105 includes a power delivery subsection 112. Power delivery subsection 112 includes a system voltage regulator 120, a chipset voltage regulator 130, and a CPU voltage regulator 140. Voltage regulator 120 regulates voltage for various hardware component loads within computer system 100. In particular, voltage regulator 120 produces a relatively constant voltage output signal (e.g., 5 VDC) from a received voltage between (8–12 VDC), depending upon the charge of power supply 110.

The load supplied by voltage regulator 120 may include components such as a hard disk drive, a cooling fan, a modem, etc. Similar to voltage regulator 120, voltage regulator 130 regulates the voltage for a load 135. In one embodiment load 135 is a chipset coupled to regulator 130. However, one of ordinary skill in the art will appreciate that additional components may be coupled to voltage regulators 130.

Figure 2:
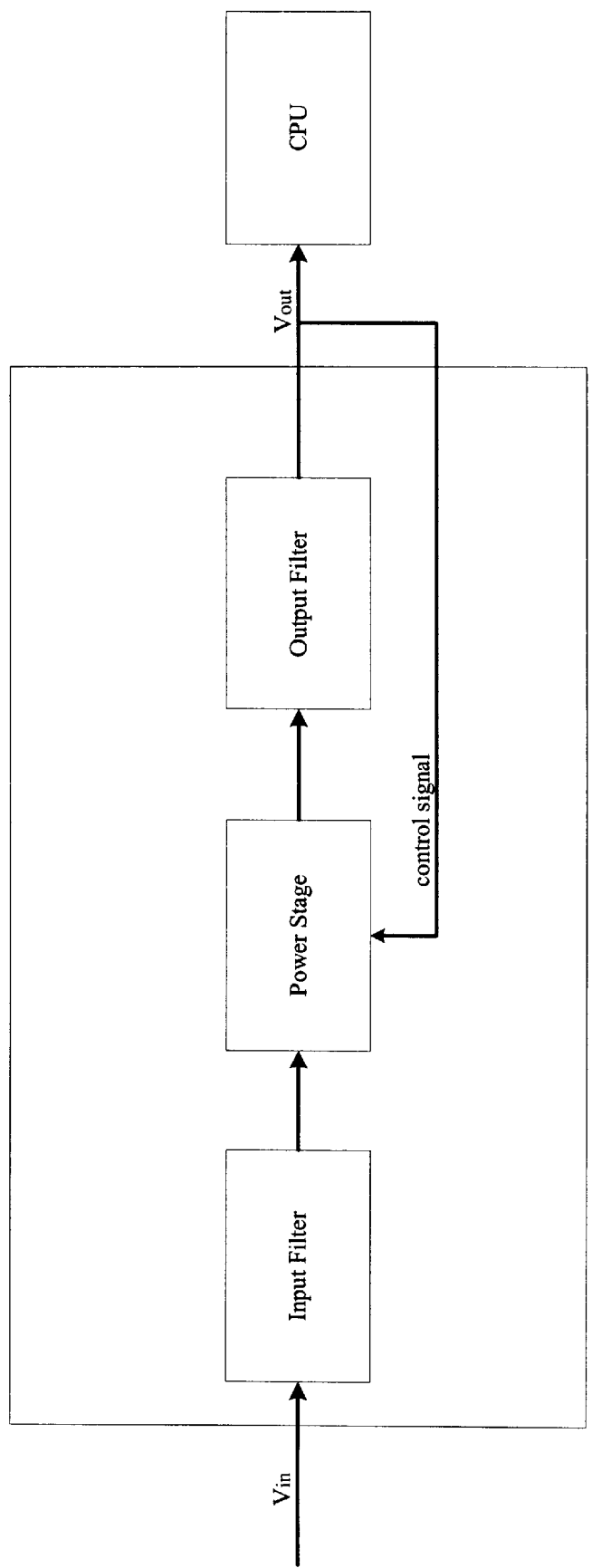
FIG. 2 illustrates a conventional voltage regulator.

Voltage regulator 140 regulates the voltage for a high performance CPU 145 coupled to regulator 140. Specifically, voltage regulator 140 provides a stable voltage source for CPU 145. FIG. 2 illustrates a conventional voltage regulator. A conventional voltage regulator transmits a CPU core voltage ($V_{out}$) that is regulated from a standard input voltage ($V_{in}$).

In order for conventional voltage regulators to meet all CPU load transient demands, voltage is provided to the CPU by designing the voltage regulator to operate at a given switching frequency based on maximum allowable power dissipation and layout area constraints. As a result, the CPU transient load demands have been managed with a large quantity of decoupling capacitors at the voltage regulator output to meet tight droop requirements.

The problem with conventional voltage regulators is that the power loss of the voltage regulator increases significantly as the switching frequency increases. For instance, with a state of the art power FET, voltage regulator power efficiency decreases from approximately 85% at a 250 kHz switching frequency to less than 50% at a 3 Mhz switching frequency. Consequently, more than half of the total power is wasted. The wasted power results in a large system cost due to power conversion and power loss management (e.g., thermal cooling).

According to one embodiment, a voltage regulator with variable switching frequencies is provided. Rather than operating CPU voltage regulator 140 at a fixed switching frequency at all times, operating using a variable switching frequency enables voltage regulator 140 to satisfy a fast transient demand from CPU 145, while maintaining a relatively low overall power loss.

Figure 3:
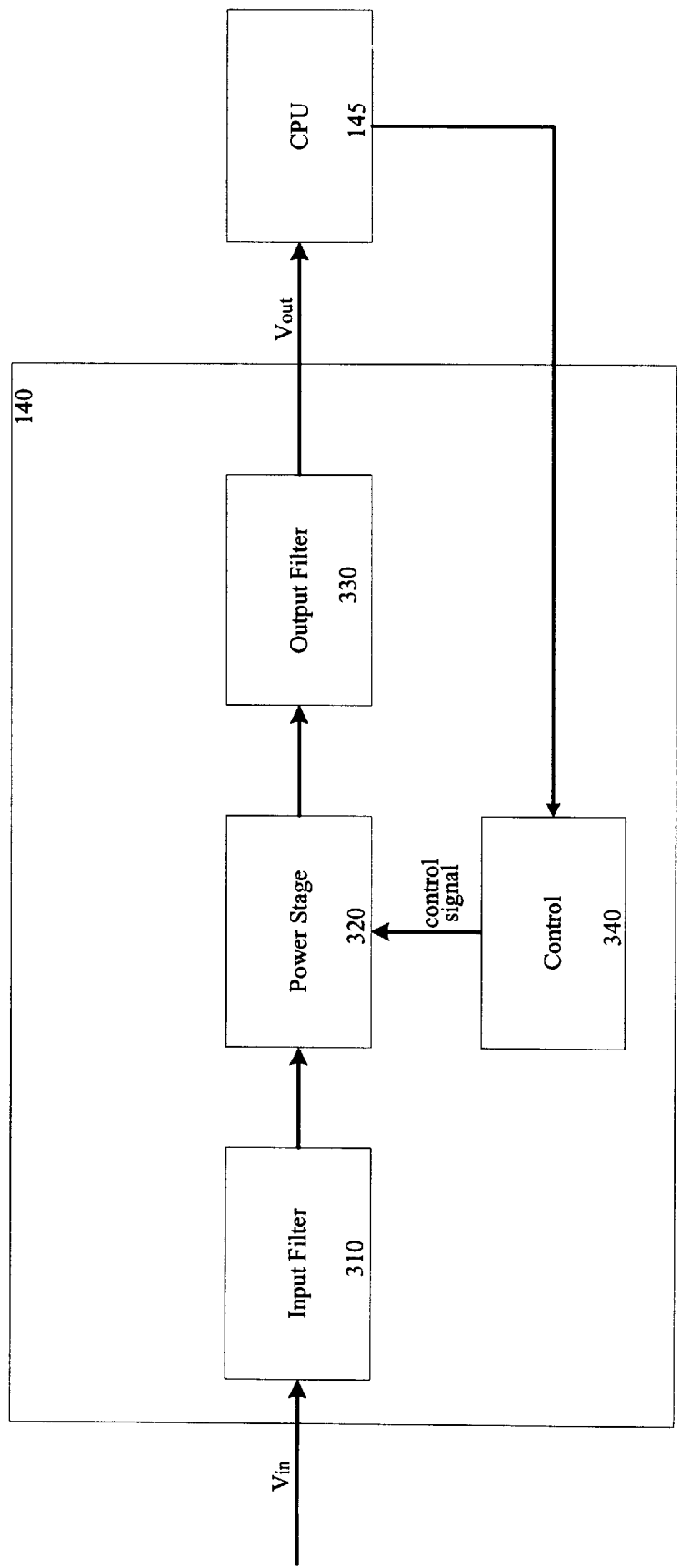
FIG. 3 is a block diagram of one embodiment of a voltage regulator coupled to a central processing unit (CPU)

FIG. 3 is a block diagram of one embodiment of a voltage regulator 140 coupled to a CPU 145. Voltage regulator 140 includes an input filter 310, a power stage 320, an output filter 330 and control circuitry 340. Input filter 310 filters the input voltage ($V_{in}$) received from power supply 110. Specifically, filter 310 conditions the received power by smoothing the $V_{in}$ voltage.

Power stage 320 is coupled to input filter 310. Power stage 320 is used to drive an output voltage based upon the conditioned $V_{in}$ voltage by switching on and off. Power stage 320 is switched on and off based upon whether a control signal received from control circuitry 340 is asserted or deasserted. In one embodiment, power stage 320 is a power MOSFET transistor. Output filter 320 is coupled to power stage 320. Output filter 320 stabilizes the voltage received from power stage 320 by smoothing the voltage. Output filter 320 transmits the voltage to CPU as an output voltage ($V_{out}$).

Control circuitry 340 is coupled to power stage 320. Control circuitry 340 transmits the control signal to power stage 320 in order to turn power stage 320 on and off. In one embodiment, control circuitry 340 receives a feedback signal from CPU 145. The feedback signal is activated whenever the transient current being demanded at CPU 145 exceeds a predetermined threshold. The feedback signal is deactivated once the transient current falls below the predetermined threshold.

Control circuitry 340 compares $V_{out}$ with a reference voltage, and periodically generates the control signal to turn the switch on/off. The control signal is asserted or de-asserted according to a variable switching frequency, as described above. According to one embodiment, the switching frequency is determined by the status of the feedback signal.

Figure 5:
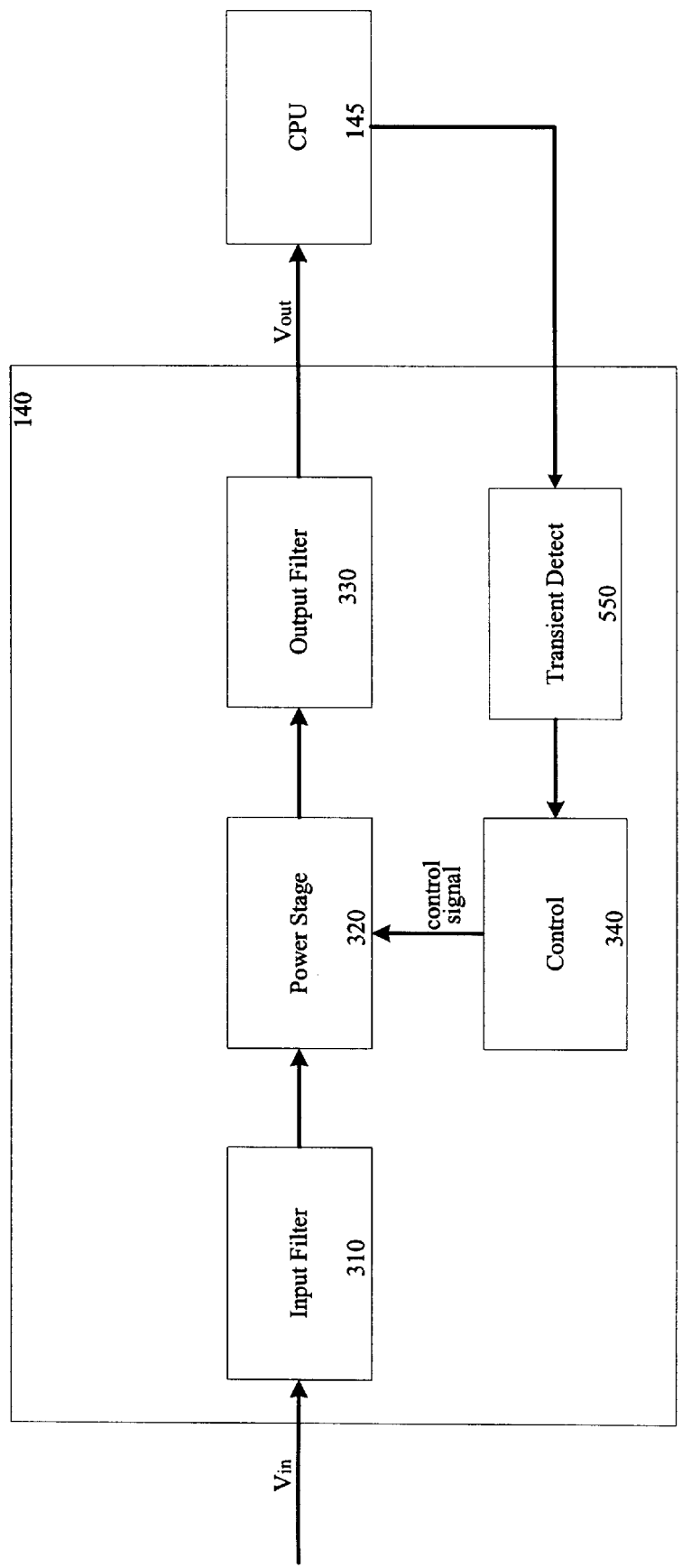
FIG. 5 is a block diagram of another embodiment of a voltage regulator coupled to a CPU.

FIG. 5 is a block diagram of another embodiment of a voltage regulator 140 coupled to a CPU 145. In this embodiment, voltage regulator 140 includes a transient detect module 550. Transient detect module 550 monitors the CPU 145 transient demand and activates/deactivates the feedback signal based upon the condition of the transient.

In normal operation, CPU 145 demands constant DC current from power supply 110. During normal operation, voltage regulator 140 operates at a lower switching frequency. However, as soon as a transient that exceeds the threshold is demanded by CPU 145, the feedback signal is activated, and provides an indication to control circuitry 340.

Control circuitry 340 responds to the transient demand by increasing the switching frequency to power stage 320. Once the transient falls below the threshold, the feedback signal is deactivated. Control circuitry 340 responds by decreasing the switching frequency to initial lower frequency. Consequently, voltage regulator 140 manages the fast transient response.

Figure 4:
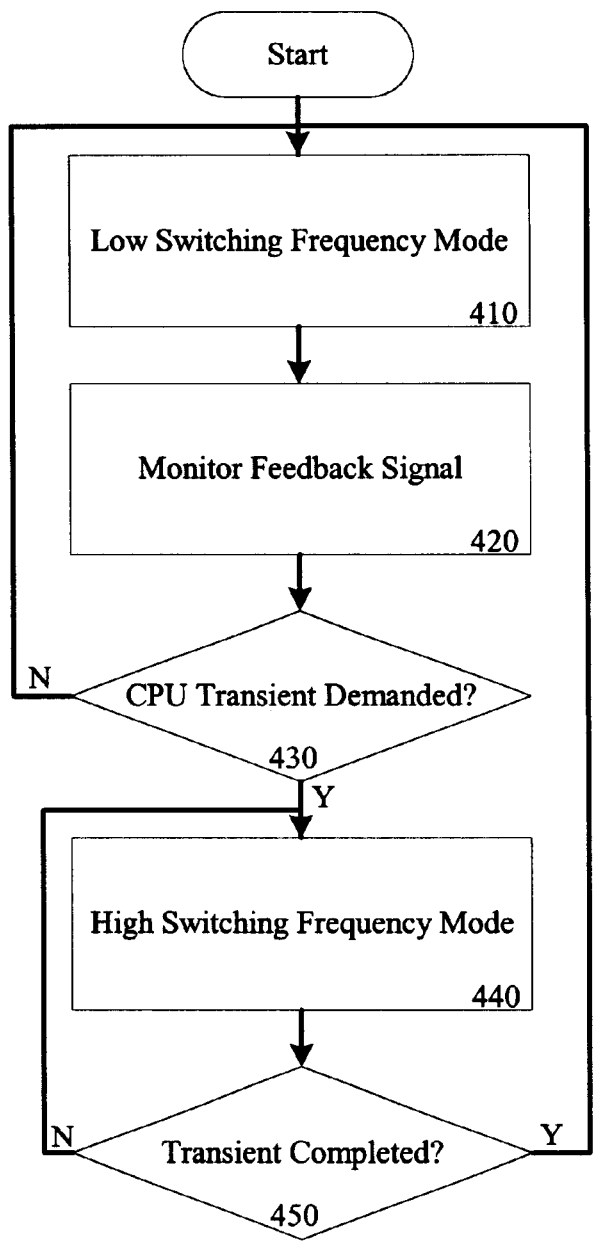
FIG. 4 is a flow diagram for one embodiment of the operation of a voltage regulator.

FIG. 4 is a flow diagram of one embodiment of the operation of a voltage regulator. At processing block 410, CPU 145 is operating in a normal mode, drawing a constant current. As a result, voltage regulator 140 is operating in a low switching frequency mode. At processing block 420, voltage regulator 140 monitors the feedback signal from CPU 145. At decision block 430, it is determined whether the feedback signal indicates that the CPU 145 transient is demanded. If the CPU 145 transient is not demanded, control is returned to processing block 410 where the low switching frequency mode is resumed.

However, if the CPU 145 transient is demanded, voltage regulator 140 switches to a high switching frequency mode, processing block 440. At processing block 450, it is determined whether the transient is completed. If the transient is not completed, control is returned to processing block 440 and voltage regulator 140 remains in the high switching frequency mode. Otherwise, control is returned to processing block 410 where the low switching frequency mode is resumed.

As described above, the CPU voltage regulator handles a fast CPU transient, while managing high power losses. The voltage regulator operates at a higher switching frequency during a CPU transient period, and at a much lower switching frequency for the remainder of the time. Since the CPU goes into a transient state relatively infrequently, and the transient state lasts for a short time compared to the normal mode, power loss is significantly reduced and the CPU transient requirement is met.

For example, a typical voltage regulator for a Pentium III® CPU, developed by Intel Corporation of Santa Clara Calif., is a 12V to 1.7V converter that operates at approximately 250 kHz. With a high quality power device, the total power loss in the voltage regulator is approximately 3.5 W. The total power loss could increase to approximately 15 W at 1 MhZ and to 32 W at 3 MhZ.

However, the power loss is significantly reduced by using the variable switching technique. For instance, assuming, worst case, that the CPU transient occurs every 1 ms repeatedly and it takes 50 s for the voltage regulator to process the transient event, the power loss of 15 W/32 W above would be reduced to 4.25 W/5.1 W.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:
    a central processing unit (CPU); and
    a voltage regulator, coupled to the CPU, that operates at a first switching frequency whenever a feedback signal is deactivated, and operates at a second switching frequency whenever the feedback signal is activated.

2. The computer system of claim 1 wherein the feedback signal is activated whenever the CPU transient is greater than a predetermined threshold and is deactivated whenever the CPU transient is less than the predetermined threshold.

3. The computer system of claim 1 wherein the voltage regulator comprises control circuitry coupled to the CPU that receives the feedback signal.

4. The computer system of claim 3 wherein the feedback signal is received at the control circuitry from the CPU.

5. The computer system of claim 3 wherein the voltage regulator further comprises:
    an input filter;
    a power stage coupled to the input filter and the control circuitry; and
    an output filter coupled to the power stage and the CPU.

6. The computer system of claim 5 further comprising a transient detect module, coupled to the CPU and the control circuitry, that monitors the CPU transient and generates the feedback signal.

7. The computer system of claim 5 further comprising a power supply coupled to the input filter.

8. A voltage regulator comprising:
    a power stage; and
    control circuitry, coupled to the power stage, to operate the voltage regulator at a variable switching frequency based upon the status of a received feedback signal, wherein the feedback signal is activated whenever a load transient is greater than a predetermined threshold and is deactivated whenever the load transient is less than the predetermined threshold.

9. The voltage regulator of claim 8 further comprising:
    an input filter coupled to the power stage; and
    an output filter coupled to the power stage and a load.

10. The voltage regulator of claim 9 wherein the feedback signal is received at the control circuitry from the load.

11. The voltage regulator of claim 9 further comprising a transient detect module, coupled to the load and the control circuitry, that monitors the load transient and generates the feedback signal.

12. A system comprising:
    a load; and
    a voltage regulator, coupled to the load, to operate at a first switching frequency whenever a feedback signal activated, and at a second switching frequency whenever the feedback signal is deactivated.

13. The system of claim 12 wherein the feedback signal is activated whenever the load transient is greater than a predetermined threshold and is deactivated whenever the load transient is less than the predetermined threshold.

14. The system of claim 12 wherein the voltage regulator comprises control circuitry coupled to the load that receives the feedback signal.

15. The system of claim 14 wherein the feedback signal is received at the control circuitry from the load.

16. The system of claim 14 wherein the voltage regulator further comprises:
    an input filter;
    a power stage coupled to the input filter and the control circuitry; and
    an output filter coupled to the power stage and the load.

17. The system of claim 16 further comprising a transient detect module, coupled to the load and the control circuitry, that monitors the load transient and generates the feedback signal.

18. The system of claim 16 further comprising a power supply coupled to the input filter.

19. A method comprising:
    operating a voltage regulator at a first switching frequency;
    receiving a first feedback signal from a load indicating that a load transient is greater than a predetermined threshold; and
    operating the voltage regulator at a second switching frequency in response to receiving the first feedback signal.

20. The method of claim 19 further comprising:
    receiving a second feedback signal from a load indicating that the load transient has fallen below the predetermined threshold; and
    operating the voltage regulator at a first switching frequency in response to receiving the second feedback signal.

* * * * *